United States Patent
Hsieh

(10) Patent No.: US 8,713,986 B2
(45) Date of Patent: May 6, 2014

(54) ELECTRONIC TORQUE WRENCH CALIBRATION DEVICE AND USING METHOD THEREOF

(75) Inventor: Chih-Ching Hsieh, Taichung (TW)

(73) Assignee: Kabo Tool Company, Taichung (TW)

( * ) Notice: Subject to any disclaimer, the term of this patent is extended or adjusted under 35 U.S.C. 154(b) by 379 days.

(21) Appl. No.: 13/179,570

(22) Filed: Jul. 11, 2011

(65) Prior Publication Data

US 2012/0031161 A1 Feb. 9, 2012

(30) Foreign Application Priority Data

Aug. 3, 2010 (TW) ................................ 99125764 A

(51) Int. Cl.
*G01L 25/00* (2006.01)
(52) U.S. Cl.
USPC ........................................ 73/1.12; 73/862.21
(58) Field of Classification Search
USPC ..................... 73/1.12, 862.21, 1.11
See application file for complete search history.

(56) References Cited

U.S. PATENT DOCUMENTS

| 4,129,035 | A | * | 12/1978 | Ango | 73/862.21 |
| 6,571,646 | B1 | * | 6/2003 | Truesdell | 73/862.21 |
| 2008/0271515 | A1 | * | 11/2008 | Dabrowski | 73/1.12 |
| 2010/0116102 | A1 | * | 5/2010 | Genestout | 81/473 |

* cited by examiner

*Primary Examiner* — Hezron E Williams
*Assistant Examiner* — Paul West
(74) *Attorney, Agent, or Firm* — CKC & Partners Co., Ltd.

(57) ABSTRACT

An electronic torque wrench calibration device is for calibrating a torque value and a pivot angle of an electronic torque wrench. The electronic torque wrench calibration device includes a base, a driving member, a torque setting member and a dial plate. One end of the driving member is driven by a electronic torque wrench, and the other end of the driving member is pivotally connected to the base. The torque setting member is disposed on the base. The torque setting member provides the driving member with a predetermined resistance against a pivotal rotation. The dial plate is pivotally disposed on a surface of the base and linked with the driving member. The dial plate includes a plurality of angular scale markings located on a surface of the dial plate.

1 Claim, 6 Drawing Sheets

ELECTRONIC TORQUE WRENCH CALIBRATION DEVICE AND USING METHOD THEREOF

RELATED APPLICATIONS

The application claims priority to Taiwan Application Serial Number 99125764, filed Aug. 3, 2010, which is herein incorporated by reference.

BACKGROUND

1. Technical Field

The present invention relates to a wrench calibration device. More particularly, the present invention relates to electronic torque wrench calibration device.

2. Description of Related Art

Mechanical tools have been gradually replaced by electrical tools gradually due to the rapid development of technology, such as an electronic torque wrench.

In comparison with a mechanical torque wrench with a complex structure, the electronic torque wrench detects a torque value and a pivot angle by using a simple sensor and a circuit. However, the electronic torque wrench easily stores the imprecise torque value and pivot angle because of the drift of the electric circuit level signal, and the drift is not easily detected. Therefore, some components are fastened too tightly or too loosely on the precision instrument, so that the instrument will not operate smoothly or break down.

SUMMARY

An electronic torque wrench calibration device is provided for calibrating a torque value and a pivot angle of an electronic torque wrench. The electronic torque wrench calibration device includes a base, a driving member, a torque setting member and a dial plate. One end of the driving member is driven by an electronic torque wrench, and the other end of the driving member is pivotally connected to the base. The torque setting member is disposed on the base. The torque setting member provides the driving member with a predetermined resistance against a pivotal rotation. The dial plate is pivotally disposed on a surface of the base and is linked with the driving member. The dial plate includes a plurality of angular scale markings located on a surface of the dial plate.

In a method for applying the electronic torque wrench calibration device, a driving head of the electronic torque wrench is inserted into the driving member. The driving member is driven to overcome the predetermined resistance against pivotal rotation, thereby rotating the driving member, wherein the predetermined resistance is provided by the torque setting member of the electronic torque wrench calibration device. To check if a torque value of the electronic torque wrench is the same as the predetermined resistance of the electronic torque wrench calibration device. To check if a pivot angle of the electronic torque wrench and an angular scale indicated on the dial plate are the same.

DETAILED DESCRIPTION

Figure 1:
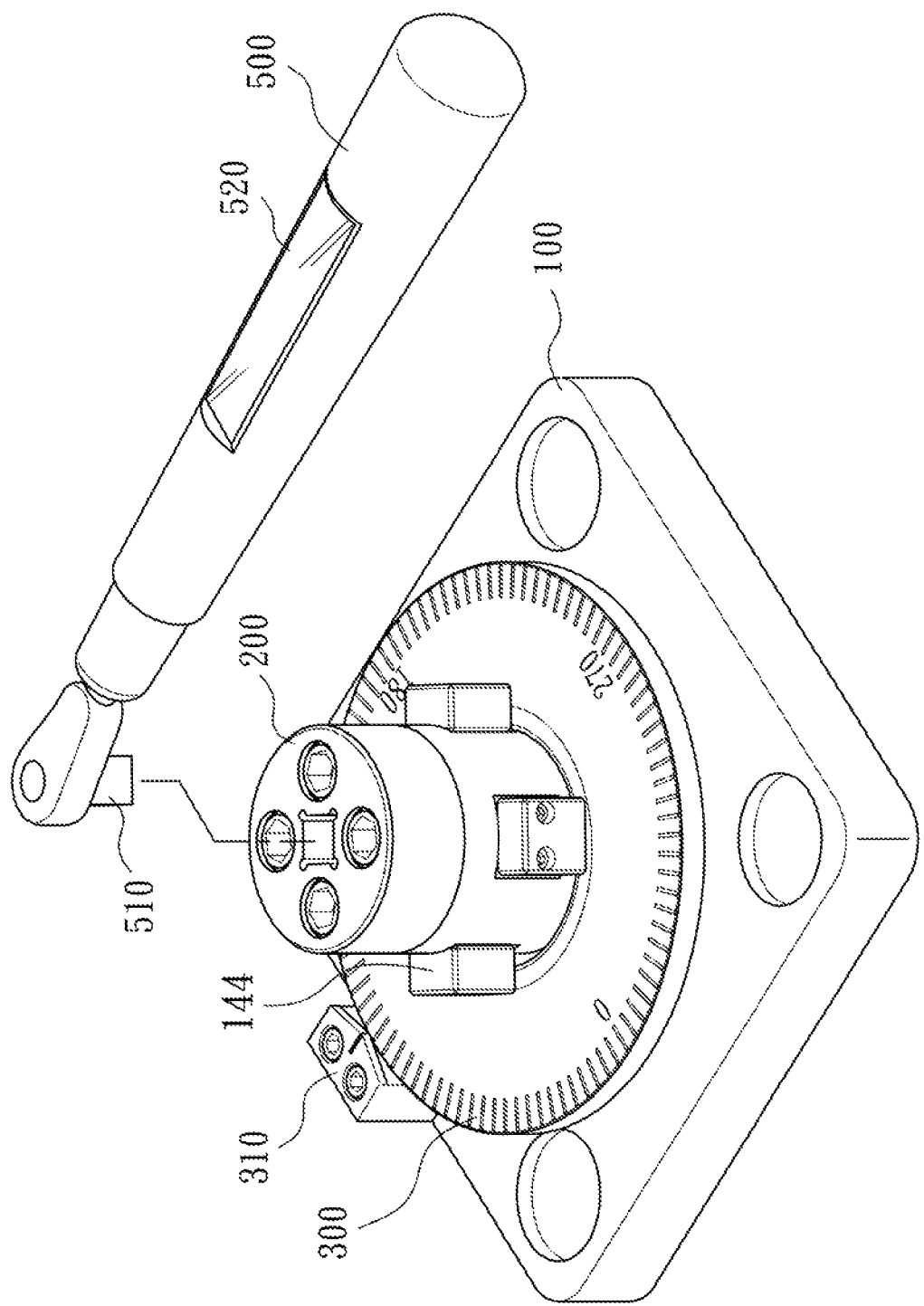
FIG. 1 is a three-dimensional view of an electronic torque wrench calibration device according to one embodiment of the present invention.

FIG. 1 is a three-dimensional view of an electronic torque wrench calibration device according to one embodiment. The electronic torque wrench calibration device is used for calibrating a torque value and a pivot angle of an electronic torque wrench. In view of appearance, the electronic torque wrench calibration device includes a base 100, a driving member 200 and a dial plate 300. The using method of the electronic torque wrench calibration device is as follows. A user may insert a driving head 510 of an electronic torque wrench 500 into the driving member 200 of the electronic torque wrench calibration device, and drives the driving member 200. The electronic torque wrench calibration device has a predetermined resistance against pivotal rotation. When the user drives the electronic torque wrench 500 to overcome the predetermined resistance against pivotal rotation, thereby rotating the driving member 200, then the user can check if a torque value of the electronic torque wrench 500 is the same as the predetermined resistance of the electronic torque wrench calibration device. When the driving member 200 is rotated, the dial plate 300 is rotated simultaneously. The surface of the dial plate 300 includes a plurality of angular scale markings, and an indicator 310 is disposed on the base 100. Therefore, after the rotation by the user, the user can check if a pivot angle of the electronic torque wrench 500 and an angular scale markings indicated on the dial plate 300 are the same. Please refer to the following description about the structure of the electronic torque wrench calibration device.

Figure 2:
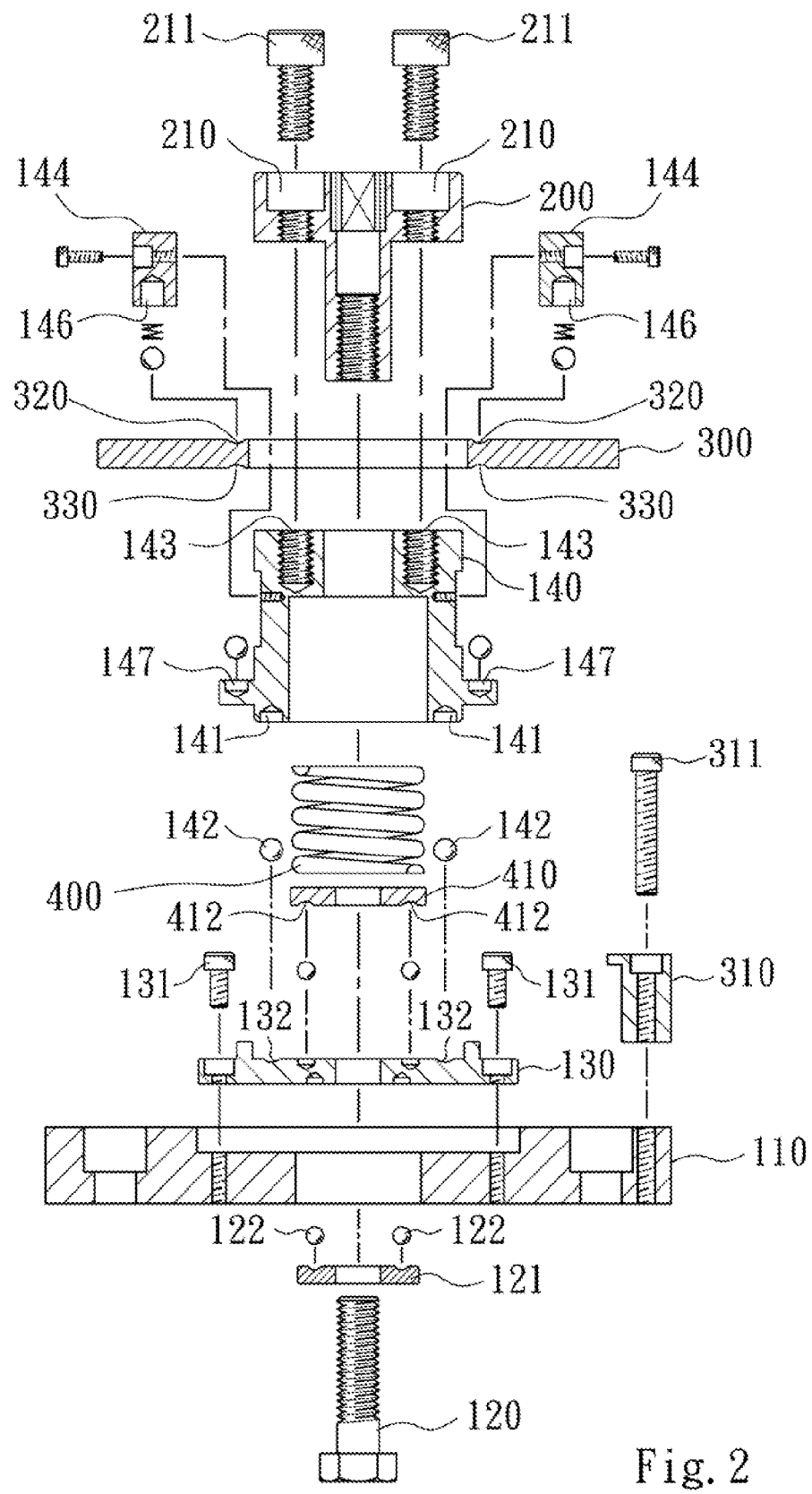
FIG. 2 is an exploded view of the electronic torque wrench calibration device of FIG. 1.
Figure 3:
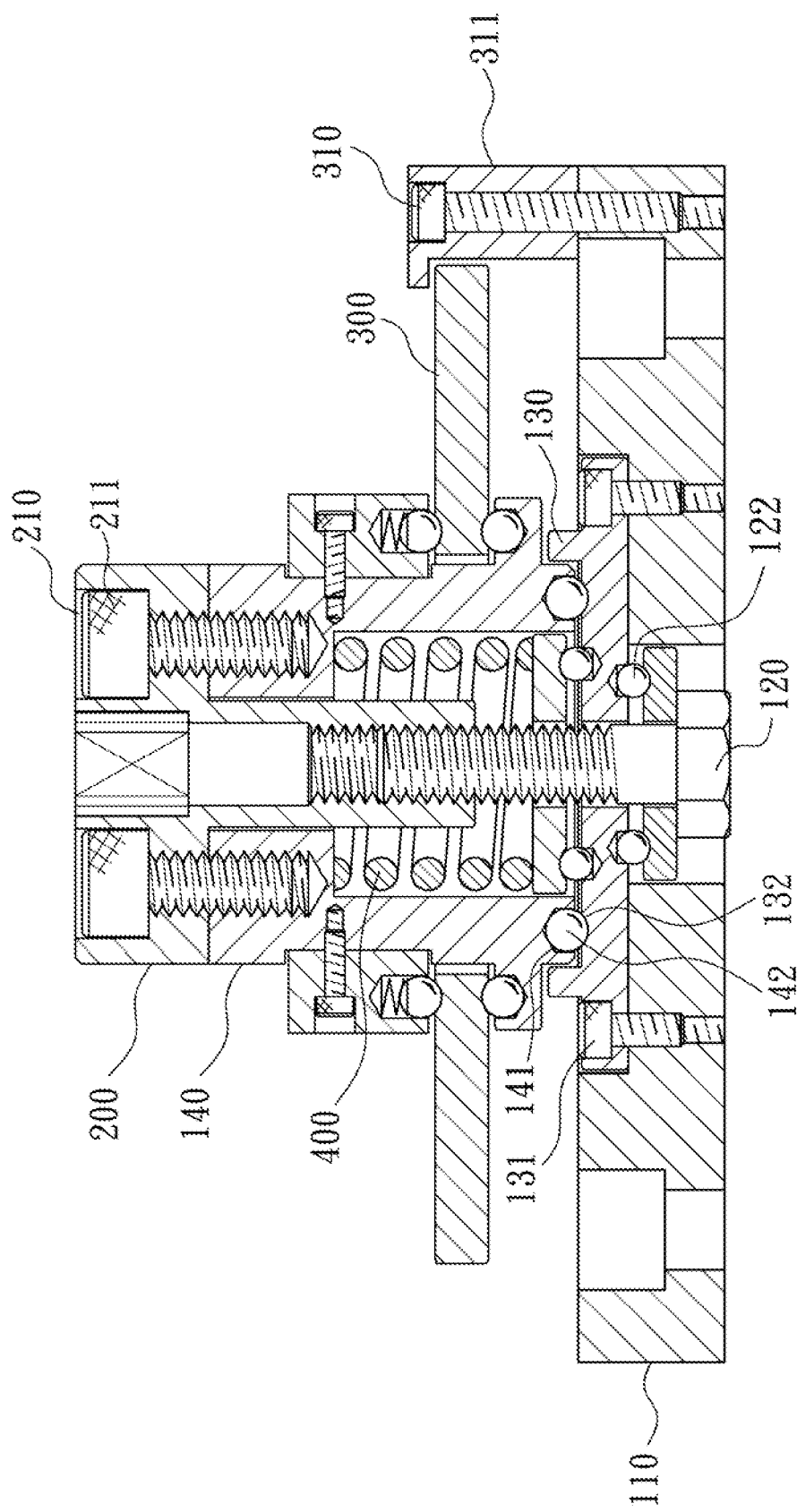
FIG. 3 is a cross-sectional view of the electronic torque wrench calibration device of FIG. 1.

Referring to FIG. 2 and FIG. 3. FIG. 2 is an exploded view of the electronic torque wrench calibration device of FIG. 1 and FIG. 3 is a cross-sectional view of the electronic torque wrench calibration device of FIG. 1. In addition to the base 100, the driving member 200 and the dial plate 300 of FIG. 1, the electronic torque wrench calibration device further includes a torque setting member 400. The base 100 includes a base body 110, a center axle 120, a gasket 130 and a driving axle 140. The center axle 120 is disposed on a center of the base body 110 and is inserted through the gasket 130 and the driving axle 140, and the gasket 130 is connected to the base body 110 by two positioning members 131. The driving axle 140 is disposed on the gasket 130 and includes a slide trough 141 and a plurality of balls 142. The balls 142 are disposed in the slide trough 141 and are opposite to a slide trough 132 of the gasket 130, so that the driving axle can be rotated about the gasket 130.

Referring to FIG. 3, one end of the driving member 200 is driven by the electronic torque wrench 500, and the other end of the driving member 200 is pivotally connected to the center axle 120 of the base 100. The driving member 200 includes a plurality of positioning holes 210 that face to a plurality of positioning holes 143 located on the driving axle 140. A plurality of positioning member 211 are inserted into the positioning holes 210 of the driving member 200 and are positioned in the positioning holes 143 of the driving axle 140, so that the driving member 200 is connected to the driving axle 140. Wherein, the center axle 120 is further inserted in an intermediate plate 121, and a plurality of balls 122 push against the intermediate plate 121 and the gasket 130. Therefore, the balls 122 can decrease the friction between the intermediate plate 121 and the gasket 130 during the center axle 120 rotates with the driving member 200 for smoothing the rotation.

The torque setting member 400 is a spring that is connected between the driving member 200 and a base 100. In detail, the spring surrounds the driving member 200. One end of the spring is connected to the inside of the driving axle 140, and the other end of the spring is connected to the gasket 130. By the arrangement, the electronic torque wrench 500 have to overcome the predetermined resistance against pivotal rotation, thereby rotating the driving member 200. When the torque value of the electronic torque wrench 500 is smaller than the predetermined resistance against pivotal rotation, the driving member 200 cannot be rotated. When the torque value of the electronic torque wrench 500 is larger than the predetermined resistance against pivotal rotation, the driving member 200 can be pivoted with the driving axle 140 coaxially. Thus, the user can check if a torque value of the electronic torque wrench which display on the operation interface 520 is the same as the predetermined resistance of the electronic torque wrench calibration device. If the torque value of the electronic torque wrench is not the same as the predetermined resistance, the torque detecting system of the electronic torque wrench 500 should be reset. Furthermore, the predetermined resistance against pivotal rotation can be adjusted into different resistance value to be suitable for different electronic torque wrench 500.

Figure 4:
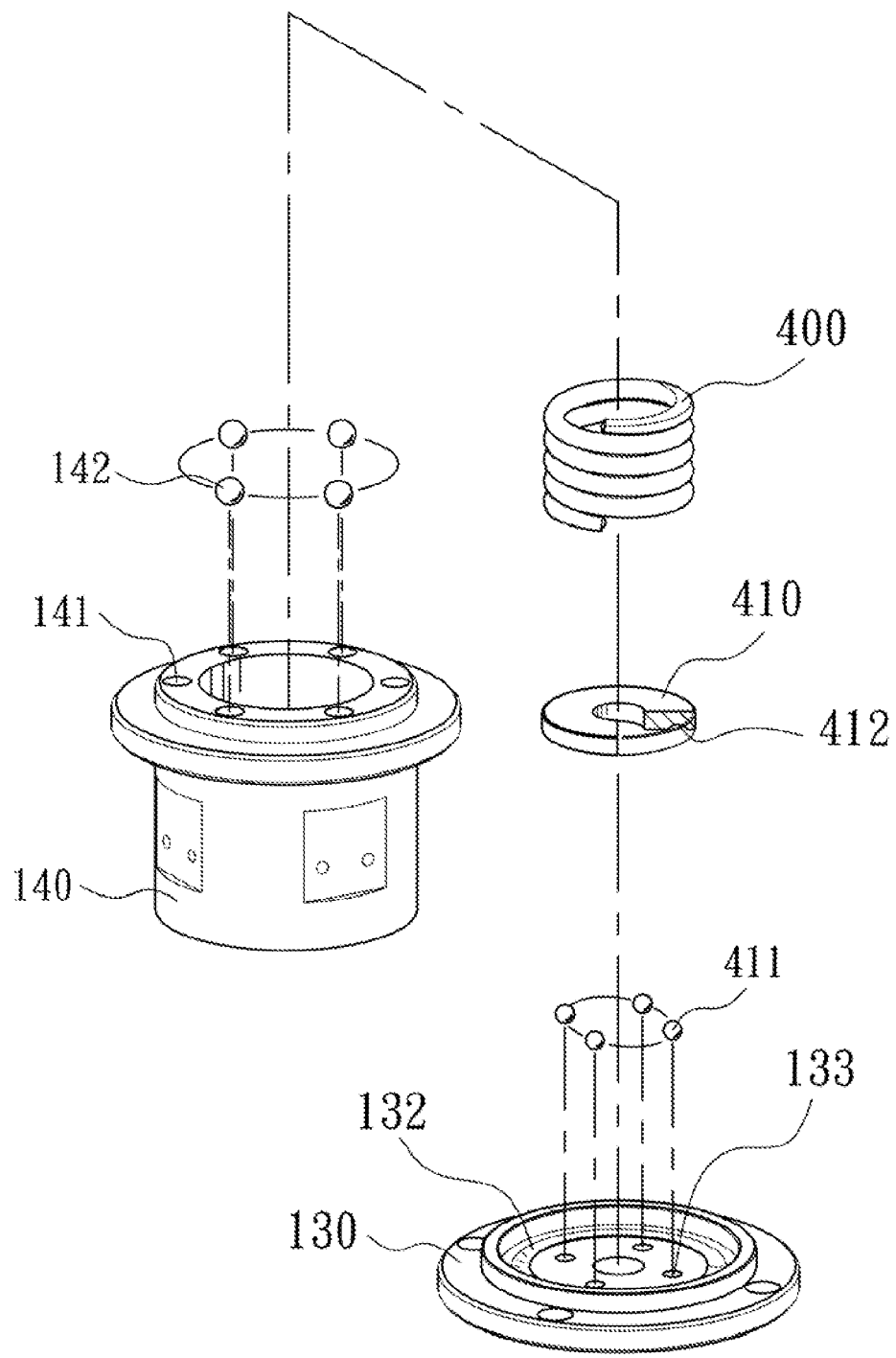
FIG. 4 is a three-dimensional exploded view of the torque setting member of FIG. 2.

FIG. 4 is a three-dimensional breakdown illustration of the torque setting member of FIG. 2. Furthermore, the torque setting member 400 can be connected to the gasket 130 via a rotating plate 410. A groove 133 is disposed on the upside of the gasket 130, and can hold a plurality of balls 411. A groove 412 is disposed on the downside of the rotating plate 410 and faces to the groove 133 of the gasket 130 so as to push the balls 411. When the torque from the user is larger than the predetermined resistance of the torque setting member 400, then the torque setting member 400 is rotated with the driving member 200 and the driving axle 140, the rotation of the torque setting member 400 can be smoother by the rotating plate 410 and the balls 411.

Figure 5:
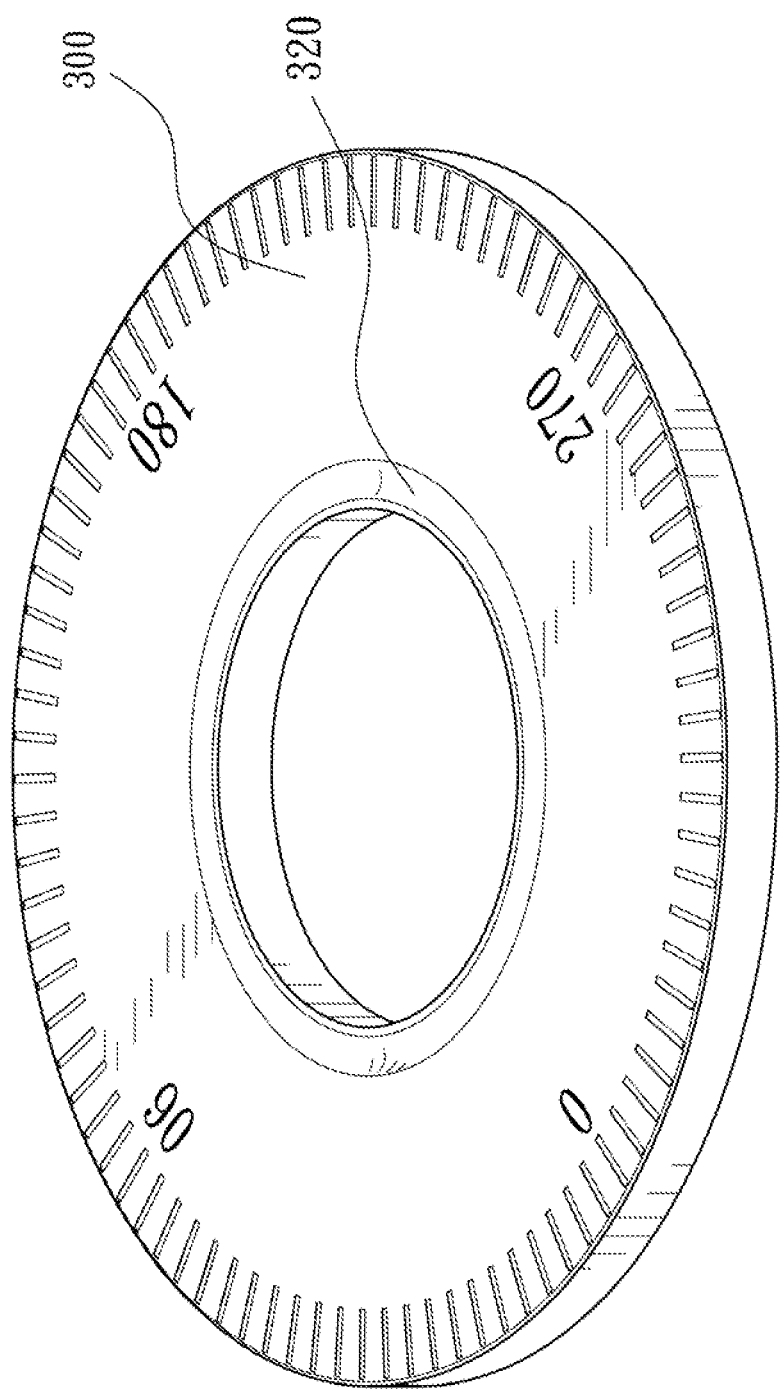
FIG. 5 is a three-dimensional view of the dial plate of FIG. 1.
Figure 6:
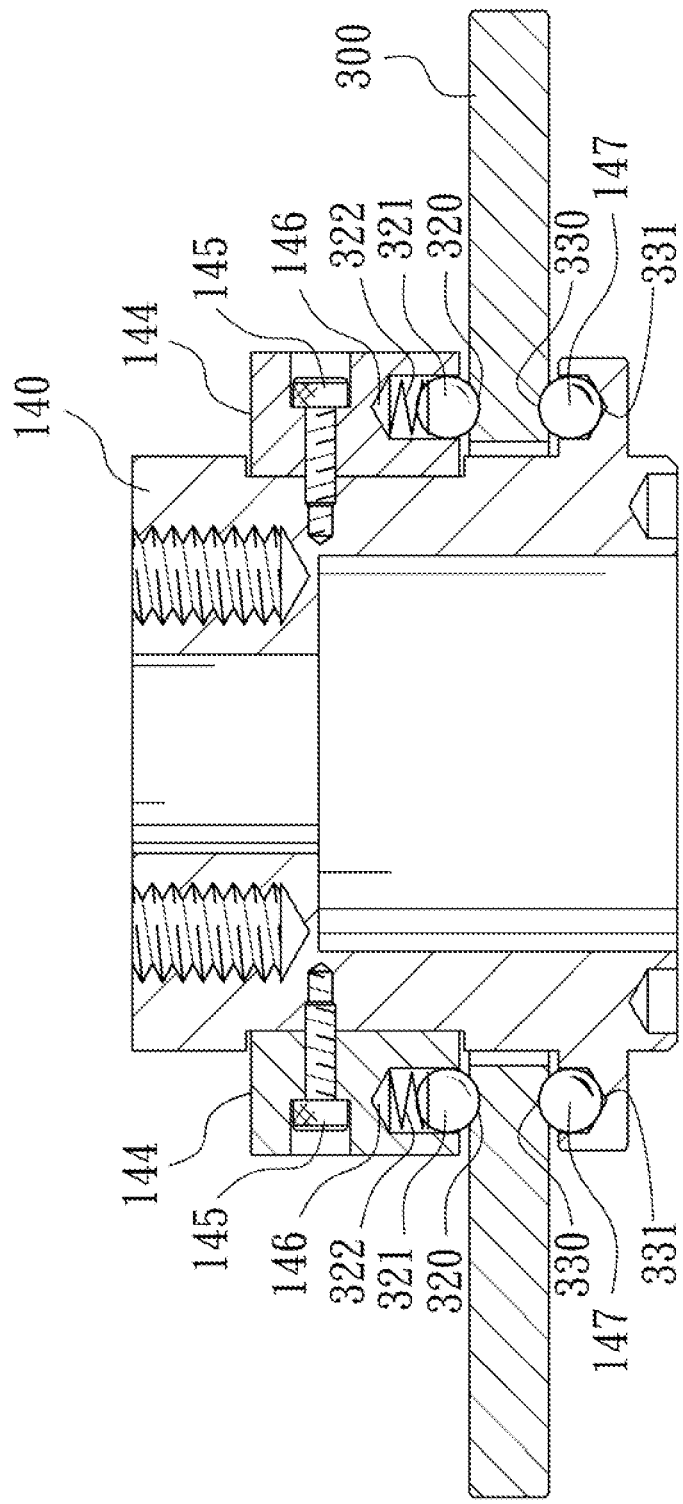
FIG. 6 is a cross-sectional view of the dial plate and the driving axle of FIG. 1.

Referring to FIG. 5 and FIG. 6. FIG. 5 is a three-dimensional view of the dial plate 300 of FIG. 1. FIG. 6 is a sectional view of the dial plate 300 and the driving axle 140 of FIG. 1. The dial plate 300 is linked with the driving axle 140 and the indicator 310 is connected to the base 100 via a positioning member 311. When the torque of the electronic torque wrench overcomes the predetermined resistance against pivotal rotation, the dial plate 300 can be rotated while the driving axle 140 is rotated. The operation interface 520 of the electronic torque wrench 500 displays the pivot angle wherein the pivot angle represent the rotating angle of the driving member 200 which driven by a driving head 510 of the electronic torque wrench 500. The user can check if a pivot angle of the electronic torque wrench 500 and an angular scale markings on the dial plate indicated by the indicator 310 are the same, and to check whether to reset the angular detecting system of the electronic torque wrench 500 or not.

In order to set the dial plate 300 on the original position in a manual way after the rotation with the driving axle 140, the upside and the downside of the dial plate 300 is disposed with the surrounding troughs 320, 330. The surrounding troughs 320, 330 of the dial plate 300 can contain at least one ball 321, 331 respectively. In detail, a containing member 144 of the driving member 140 is set on the surrounding trough 320 of the upside of the dial plate 300. The containing member 144 is connected to the side of the driving axle 140 via a screw 145, and includes a containing trough 146 which has an open end set toward the surrounding trough 320 of the upside of the dial plate 300. A spring 322 is disposed in the containing trough 146. One end of the spring 322 is connected to the containing trough 146, and the other end of the spring 322 is connected to the ball 321. Therefore, the manual way to set the dial plate 300 on the original position can be smooth due to the spring 322 pushing the ball 321 toward the surrounding trough 320. Similarly, the driving axle 140 further includes a containing trough 147 which is set toward the surrounding trough 330 of the downside of the dial plate 300 and the ball can be contained thereof for smoothing the rotation of the dial plate by pushing the surrounding trough 330.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for applying an electronic torque wrench calibration device, the method comprising:
   inserting a driving head of the electronic torque wrench into a driving member of the electronic torque wrench calibration device, wherein one end of the driving member is driven by the electronic torque wrench, and the other end of the driving member is pivotally connected to a base of the electronic torque wrench calibration device;
   driving the driving member to overcome a predetermined resistance against a pivotal rotation, thereby rotating the driving member, wherein the predetermined resistance is provided by a torque setting member of the electronic torque wrench calibration device which disposed on the base;
   checking if a torque value of the electronic torque wrench is the same as the predetermined resistance of the electronic torque wrench calibration device; and
   checking if a pivot angle value outputted by the electronic torque wrench and an angular scale markings indicated on a dial plate are the same, wherein the dial plate is pivotally disposed on a surface of the base and linked with the driving member, the dial plate comprises a plurality of angular scale markings located on a surface of the dial plate.

* * * * *